(12) United States Patent
Charbonneau-Lefort et al.

(10) Patent No.: US 9,497,525 B2
(45) Date of Patent: Nov. 15, 2016

(54) OPTICAL ENGINES AND OPTICAL CABLE ASSEMBLIES HAVING ELECTRICAL SIGNAL CONDITIONING

(71) Applicant: CORNING OPTICAL COMMUNICATIONS LLC, Hickory, NC (US)

(72) Inventors: Mathieu Charbonneau-Lefort, San Jose, CA (US); Richard Clayton Walker, Palo Alto, CA (US); Michael John Yadlowsky, Sunnyvale, CA (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/484,564

(22) Filed: Sep. 12, 2014

(65) Prior Publication Data

US 2016/0080843 A1 Mar. 17, 2016

(51) Int. Cl.

| | |
|---|---|
| *H04B 10/00* | (2013.01) |
| *H04B 10/06* | (2006.01) |
| *G02F 1/03* | (2006.01) |
| *H04Q 11/00* | (2006.01) |
| *H04B 10/40* | (2013.01) |
| *H04B 10/69* | (2013.01) |

(52) U.S. Cl.
CPC .......... *H04Q 11/0071* (2013.01); *H04B 10/40* (2013.01); *H04B 10/69* (2013.01); *H04B 10/695* (2013.01)

(58) Field of Classification Search
CPC .... G06F 3/12; G02B 6/4293; H04Q 11/0071
USPC ..................................................... 398/45, 43
See application file for complete search history.

(56) References Cited

U.S. PATENT DOCUMENTS

| | | | |
|---|---|---|---|
| 6,014,743 A | 1/2000 | Henry et al. | |
| 6,628,214 B1* | 9/2003 | Kawase | G09G 5/006 341/100 |
| 6,885,798 B2 | 4/2005 | Zimmel | |
| 6,915,028 B2 | 7/2005 | Lyons | |

(Continued)

FOREIGN PATENT DOCUMENTS

| | | | | |
|---|---|---|---|---|
| JP | 2013137479 A | 7/2013 | ............... | G02B 6/42 |
| WO | 2008039781 A2 | 4/2008 | | |
| WO | WO2013/147816 A1 | 10/2013 | ............... | G02B 6/38 |

OTHER PUBLICATIONS

EP15183449 Search Report Dated Feb. 9, 2016.

*Primary Examiner* — Oommen Jacob (57) ABSTRACT

Optical engines and optical cable assemblies incorporating optical engines providing duty cycle correction on multiplexed low-speed signals are disclosed. In one embodiment, an optical engine includes a low-speed Tx line, a low-speed Rx line, an optical transceiver device, and a control circuit. A low-speed Tx signal is transmitted on the low-speed Tx line and a low-speed Rx signal is received on the low-speed Rx line. The optical transceiver device further includes a laser control pin operable to control a laser configured to provide light on an optical Tx lane, and an optical detect pin operable to provide an indication as to light detected at an optical Rx lane. A Tx signal conditioning circuit configured to condition the low-speed Tx signal is coupled to the laser control pin, and/or a Rx signal conditioning circuit configured to condition the low-speed Rx signal is coupled to the optical detect pin.

25 Claims, 9 Drawing Sheets

(56) References Cited

U.S. PATENT DOCUMENTS

| | | |
|---|---|---|
| 6,915,058 B2 | 7/2005 | Pons |
| 7,346,243 B2 | 3/2008 | Cody et al. |
| 7,627,218 B2 | 12/2009 | Hurley |
| 7,911,485 B2* | 3/2011 | Rykowski .............. G09G 5/06 345/690 |
| 8,891,963 B2* | 11/2014 | Patel .................... H04L 12/00 370/360 |
| 8,905,918 B2* | 12/2014 | Kato ................. A61B 1/00055 398/17 |
| 9,097,864 B2 | 8/2015 | Isenhour et al. |
| 2001/0021051 A1* | 9/2001 | Kim ................... H03K 5/1504 398/147 |
| 2002/0181608 A1* | 12/2002 | Kim ....................... H04L 5/06 375/295 |
| 2004/0228370 A1* | 11/2004 | Riesenman ......... G06F 13/4027 370/537 |
| 2004/0263941 A1* | 12/2004 | Chen .................... G09G 5/006 359/245 |
| 2005/0041706 A1 | 2/2005 | Magoon |
| 2005/0063707 A1* | 3/2005 | Imai ...................... H04L 25/14 398/141 |
| 2005/0094676 A1* | 5/2005 | Iwami .................... H04N 7/22 370/527 |
| 2005/0259242 A1* | 11/2005 | Bridge ............. G01M 11/3109 356/73.1 |
| 2006/0008276 A1* | 1/2006 | Sakai .................... H04B 10/00 398/141 |
| 2006/0069829 A1* | 3/2006 | Thornton ................ H04N 9/67 710/106 |
| 2009/0180739 A1 | 7/2009 | Khemakhem et al. |
| 2009/0268491 A1 | 10/2009 | Wilson |
| 2010/0054733 A1 | 3/2010 | Hosking |
| 2012/0170927 A1 | 7/2012 | Huang et al. |
| 2016/0020856 A1 | 1/2016 | Charbonneau-Lefort et al. |

* cited by examiner

OPTICAL ENGINES AND OPTICAL CABLE ASSEMBLIES HAVING ELECTRICAL SIGNAL CONDITIONING

BACKGROUND

1. Field

The present disclosure generally relates to optical communication and, more particularly, to optical engines and optical cable assemblies incorporating optical engines providing duty cycle correction.

2. Technical Background

As the data rate of communication protocols increases, it becomes difficult to transmit signals using purely electrical cables. Optics has provided a solution to the distance versus data rate problem for the telecommunication and data center markets. Benefits of optical fiber include longer reach, extremely wide bandwidth, and low noise operation. Because of these advantages, optical fiber is increasingly being used for a variety of applications, including, but not limited to, broadband voice, video, and data transmission. Optical fiber is emerging as the lowest cost and most compact interconnect technology in an increasing number of consumer electronics applications, especially at lengths greater than a few meters.

Some data transmission interfaces require low-speed data (e.g., control data at data rates such as 1 Mb/s) to be transmitted simultaneously with high-speed data (e.g., 10 Gb/s and beyond). However, the additional low-speed data require an additional transmission medium, such as copper conductors or additional optical fibers. The additional transmission medium may increase the diameter of the optical cable, and, in the case of copper conductors, require DC isolation between ends of the optical cable as well as provide additional shielding requirements due to electro-magnetic interference concerns. Further, intercepting and retransmitting low-speed data over optical fibers may be costly due to the strict timing requirements placed on the microcontroller by the communication protocol. Additional optical fibers for low-speed transmission may increase the cost of the optical cable.

In some cases, duty cycle distortion may occur with respect to low-speed data transmission. For example, sources of duty cycle distortion may include components that have uneven rise and fall times or different high-to-low and low-to-high digital signal decision thresholds. In the case of optical transceiver devices, duty cycle distortion may also arise if the response time between the electrical and optical signals (and vice-versa) is different in the case of a rising edge or a falling edge. Duty cycle distortion may introduce errors into the low-speed data signal.

SUMMARY

Embodiments of the present disclosure are directed to transmission of high-speed data and low-speed data across one or more optical fibers without the need for additional optical fibers or bulky electrical conductors. More specifically, embodiments are directed to optical engines and optical cable assemblies incorporating optical engines that are capable of optically communicating both relatively low-speed data signals and relatively high-speed data signals over optical fibers without the need for additional transmission medium for the low-speed data signals, and which transmit the low-speed data signal directly, without the need to receive and decode before resending it. Embodiments of the present disclosure further include one or more signal conditioning circuits that correct for duty cycle distortion that may occur on low-speed data signals as a result of the operation of an optical transceiver device or other electrical components.

In one embodiment, an optical engine includes a low-speed transmit (Tx) line, a low-speed receive (Rx) line, an optical transceiver device, a control circuit, and a Tx signal conditioning circuit and/or a Rx signal conditioning circuit. A low-speed Tx signal is transmitted on the low-speed Tx line and a low-speed Rx signal is received on the low-speed Rx line. The optical transceiver device includes an optical Tx lane and an optical Rx lane, wherein the optical transceiver device is configured to convert high-speed electrical signals into high-speed optical signals provided on the optical Tx lane, and convert high-speed optical signals received on the optical Rx lane into high-speed electrical signals. The optical transceiver device further includes a laser control pin operable to control a laser configured to provide light on the optical Tx lane, and an optical detect pin operable to provide an indication as to light detected at the optical Rx lane. The control circuit is configured to selectively route the low-speed Tx signal at the low-speed Tx line to the optical transceiver device in real time such that the optical transceiver device converts the low-speed Tx signal to a low-speed optical Tx signal at the optical Tx lane, and/or selectively route the low-speed Rx signal on the optical detect pin to the low-speed Rx line in real time. The Tx signal conditioning circuit is coupled to the laser control pin, and/or the Rx signal conditioning circuit is coupled to the optical detect pin. The Tx signal conditioning circuit is configured to condition the low-speed Tx signal prior to the optical transceiver device, and the Rx signal conditioning circuit is configured to condition the low-speed Rx signal received from the optical transceiver device.

In another embodiment, an optical engine includes a low-speed Tx line, a low-speed Rx line, an optical transceiver device, and a Tx signal conditioning circuit and/or a Rx signal conditioning circuit. A low-speed Tx signal is transmitted on the low-speed Tx line and a low-speed Rx signal is received on the low-speed Rx line. The optical transceiver device includes a laser control pin operable to control a laser configured to provide light on an optical Tx lane, and an optical detect pin operable to provide an indication as to light detected at an optical Rx lane. The optical transceiver device is configured to convert high-speed electrical signals into high-speed optical signals provided on the optical Tx lane, and convert high-speed optical signals received on the optical Rx lane into high-speed electrical signals. The Tx signal conditioning circuit is coupled to the laser control pin, and/or the Rx signal conditioning circuit is coupled to the optical detect pin. The Tx signal conditioning circuit is configured to condition the low-speed Tx signal prior to the optical transceiver device, and the Rx signal conditioning circuit is configured to condition the low-speed Rx signal received from the optical transceiver device.

In yet another embodiment, an optical cable assembly includes an optical cable having a plurality of optical fibers, a first end, and a second end. The optical cable assembly further includes a first electrical connector assembly disposed at the first end of the optical cable and a second electrical connector assembly disposed at the second end of the optical cable, each of the first electrical connector assembly and the second electrical connector assembly having a housing and an optical engine disposed within the housing. The optical engine includes a low-speed Tx line, a low-speed Rx line, an optical transceiver device, a control circuit, and a Tx signal conditioning circuit and/or a Rx signal conditioning circuit. A low-speed Tx signal is transmitted on the low-speed Tx line and a low-speed Rx signal is received on the low-speed Rx line. The optical transceiver device includes an optical Tx lane and an optical Rx lane, wherein the optical transceiver device is configured to convert high-speed electrical signals into high-speed optical signals provided on the optical Tx lane, and convert high-speed optical signals received on the optical Rx lane into high-speed electrical signals. The optical transceiver device further includes a laser control pin operable to control a laser configured to provide light on the optical Tx lane, and an optical detect pin operable to provide an indication as to light detected at the optical Rx lane. The control circuit is configured to selectively route the low-speed Tx signal at the low-speed Tx line to the optical transceiver device in real time such that the optical transceiver device converts the low-speed Tx signal to a low-speed optical Tx signal at the optical Tx lane, and/or selectively route the low-speed Rx signal on the optical detect pin to the low-speed Rx line in real time. The Tx signal conditioning circuit is coupled to the laser control pin, and/or the Rx signal conditioning circuit is coupled to the optical detect pin. The Tx signal conditioning circuit is configured to condition the low-speed Tx signal prior to the optical transceiver device, and the Rx signal conditioning circuit is configured to condition the low-speed Rx signal received from the optical transceiver device.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments of the present disclosure are directed to optical engines and optical cable assemblies incorporating optical engines capable of communicating both payload data (provided by high-speed signals) and management/control data (provided by low-speed signals) over optical fibers. The low-speed signals have a data rate that is lower than the high-speed payload data signals. Some communication protocols require transmission of management or control data to maintain the communications link. Such data may include cable manufacture identification number, cable connection status, transmission status, and any other data required by the communication protocol. Embodiments of the present disclosure enable the transmission of low-speed signals representing data such as management/control data over a fiber communications link without additional transmission medium (e.g., copper wires or additional optical fibers) or costly transmission circuitry for receiving and resending the low-speed data. More specifically, embodiments of the present disclosure allow low-speed signals representing management or control data to "pass through" the optical engine within the connector of the optical cable assembly. As used herein, the term "pass-through" means that the low-speed signals are routed directly through the connector without being received and then resent by a microcontroller or other processing component. Accordingly, embodiments of the present disclosure provide separate electrical connections within a connector for relatively low-speed control signals and relatively high-speed payload data signals. The low-speed and high-speed signals are multiplexed on the same optical fibers.

As described in more detail below, low-speed signaling over the optical fibers is accomplished by modulating lasers of an optical transceiver device on and off, and comparing photocurrent received at the other end to a threshold value. Depending on the data rate of the low-speed communication, it is possible that this signaling scheme introduces distortion in the transmitted and received low-speed signals.

As an example, if the indicator of received light has unequal rise and fall times, then the received signal transmitted electrically (i.e., the Rx low-speed signal) may suffer from duty cycle distortion. Embodiments of the present disclosure provide signal conditioning of low-speed control signals, such as duty cycle correction. Various optical engines and optical cable assemblies having multiplexed high-speed and low-speed data signals with low-speed duty cycle correction are disclosed in detail below.

Figure 1:
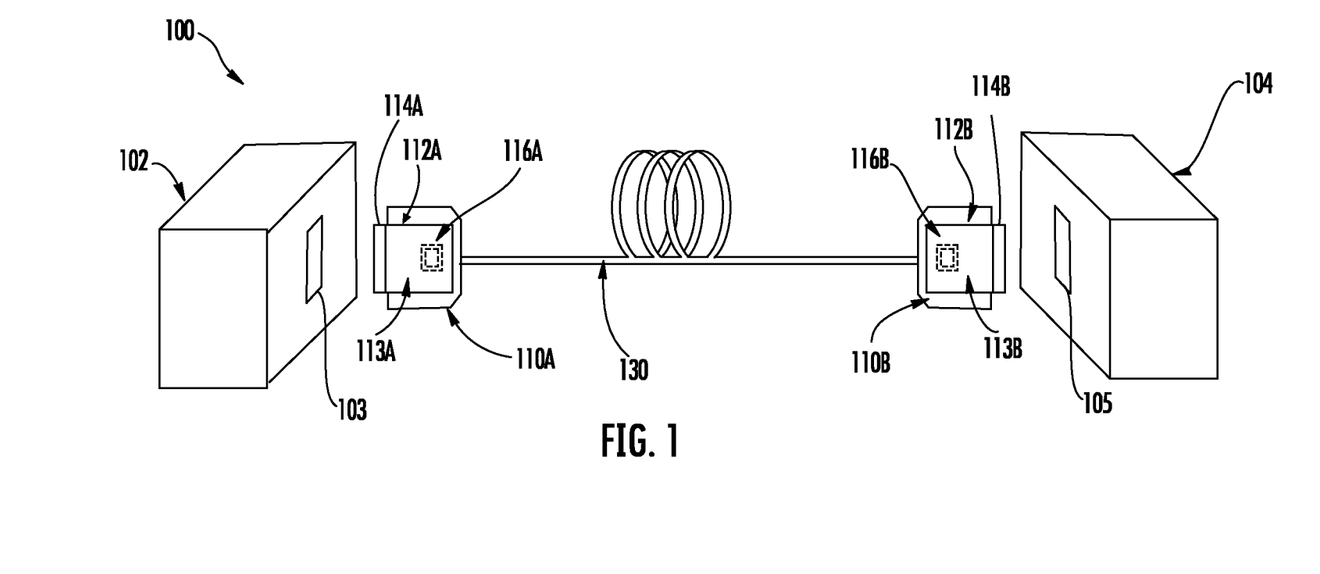
FIG. 1 schematically depicts an example optical cable assembly connected to two electronic devices according to one or more embodiments described and illustrated herein.

Referring now to FIG. 1, an optical cable assembly 100 is schematically illustrated. Generally, the optical cable assembly 100 comprises a first electrical connector 110A at a first end of an optical cable 130 and a second electrical connector 110B at a second end of the optical cable 130. The first and second electrical connectors 110A, 110B include a plug portion 114A, 114B, respectively, having electrical contact (s) that mate with a receptacle 103, 105 of an electronic device 102, 104, respectively. In other embodiments, the first and/or second electrical connectors 110A, 110B are configured as a receptacle for mating with a plug of an electronic device. The electronic devices 102, 104 may be any electronic device including, but not limited to, a server device, a personal computer, an external storage device, a photographic device, a display device, a cellular phone, and a media player.

An optical engine 112A, 112B resides in first and second electrical connectors 110A, 110B of the optical cable assembly 100 that is responsible for realizing the electrical-to-optical conversion and optical-to-electrical conversion. The optical engines 112A, 112B may comprise a printed circuit board assembly 113A, 113B that maintains an optical transceiver device 116A, 116B and other electronic components for electro-optical and opto-electrical conversion.

The optical cable assemblies described herein are active optical cable assemblies in the sense that they actively convert optical and electrical signals within the cable. As described in more detail below, the optical engines 112A, 112B convert high-speed electrical signals (i.e., payload data) into high-speed optical signals inside the first and second electrical connector 110A, 110B, which are transmitted over optical fibers and converted back to the electrical domain inside the electrical connector at the opposite end of the optical cable assembly 100. The optical engines 112A, 112B further include an optional optical module (not shown) to couple the light in and out of optical fibers within the optical cable 130. Active optical cables are attractive for many consumer applications because they provide familiar tested electrical interfaces while providing the optical transport advantages of optical fiber communication.

As stated above, embodiments of the present disclosure may utilize any communications protocol where low-speed control data is sent in addition to high-speed payload data. For example, interconnects may include two bi-directional high-speed lanes with a separate bi-directional low-speed channel to manage the state of the communications link provided by a cable assembly. Concepts described herein may be utilized in any application wherein a communications protocol requires low-speed data transmission in addition to high-speed payload data transmission. As used herein, "low-speed" signals, whether optically or electrically transmitted and received, mean control signals having a data rate that is lower than a data rate of the payload data (i.e., the "high-speed" signals). Further, as used herein, "high-speed" signals, whether optically or electrically transmitted and received, mean payload data having a data rate that is higher than a data rate of the control signals (i.e., the "low-speed" signals). As an example, a high-speed signal is 10× faster than a low-speed signal, but other multiples are possible between the high-speed signal and the low-speed signal. For instance, the high-speed signal may be 100× or faster than a low-speed signal, and may even be faster.

Figure 2A:
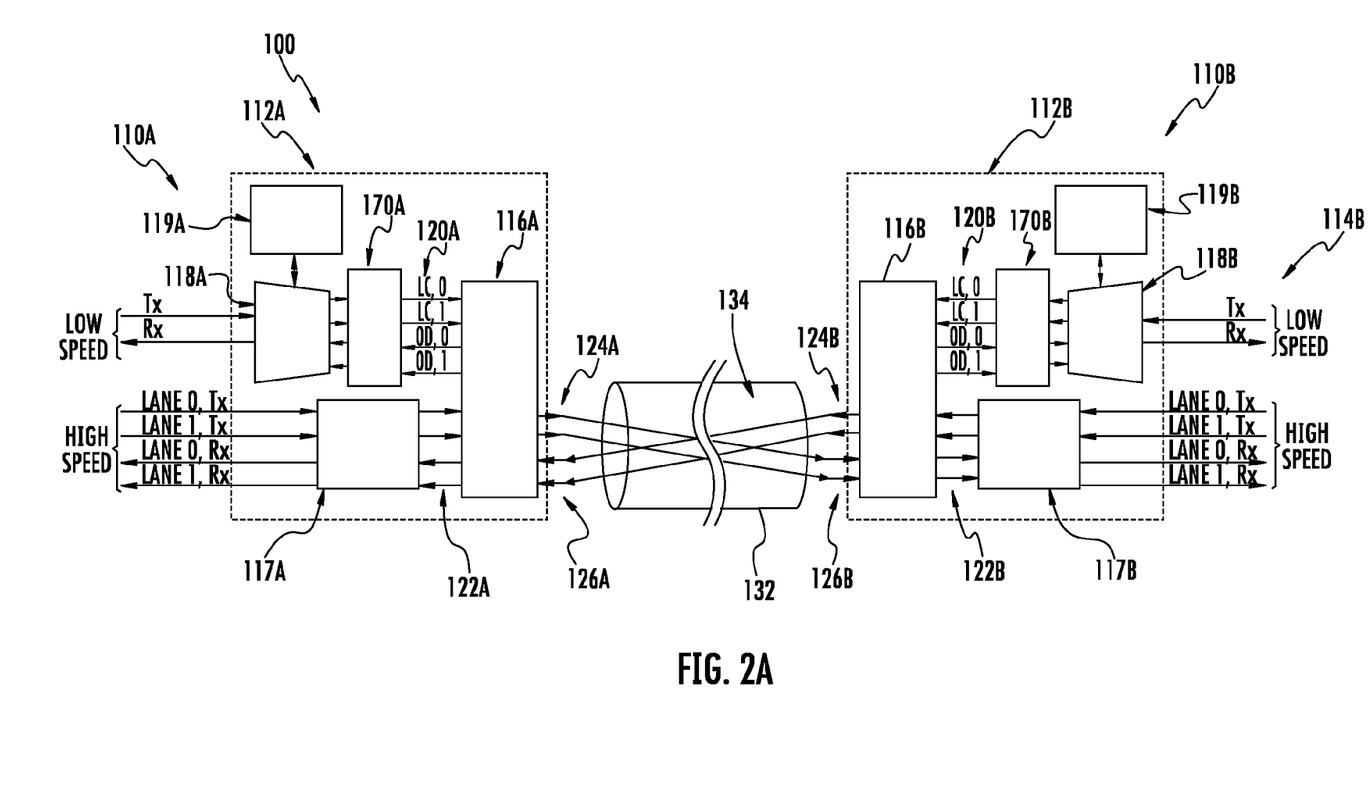
FIG. 2A schematically depicts optical engines within electrical connectors of an optical cable assembly, wherein signal conditioning circuits of the optical engines are disposed between the optical transceiver device and the control circuit according to one or more embodiments described and illustrated herein.

Referring now to FIG. 2A, the optical cable assembly 100 is schematically illustrated in greater detail. Each electrical connector 110A, 110B includes a plug portion 114A, 114B providing electrical contacts for two high-speed Tx lanes (lane 0 Tx and lane 1 Tx), two high-speed Rx lanes (lane 0 Rx and lane 1 Rx), a low-speed Tx line and a low-speed Tx line. Lane 0 is a first high-speed data lane while lane 1 is a second high-speed data lane. It should be understood that any number of high-speed data lanes may be used.

The optical engine 112A, 112B includes an optical transceiver device 116A, 116B, a microcontroller 119A, 119B, a control circuit 118A, 118B for routing low-speed signals, and one or more low-speed signal conditioning circuits 170A, 170B capable of duty cycle correction as described in detail below. In some embodiments, a signal conditioning circuit 117A, 117B may be provided to condition the high-speed signals on high-speed lanes 1 and 0. The signal conditioning circuit 117A, 117B may provide functionality such as retiming, equalization, pre-emphasis, de-emphasis, and the like. The conditioned signals may then be passed to the optical transceiver device 116A, 116B by high-speed inputs and outputs 122A, 122B (i.e., high-speed data lanes).

The optical transceiver device 116A, 116B comprises both optical transmitters and receivers. Typically, the transmitters are vertical-cavity surface-emitting lasers (VCSELs) and the receivers are photodiodes, but other types of suitable transmitters or receivers are possible. The lasers are driven by a laser driver integrated circuit ("IC"), and the signal generated by the photodiodes is amplified using a trans-impedance amplifier ("TIA"), typically followed by a limiting amplifier. In some embodiments, both transmit and receive functions of the optical transceiver device 116A, 116B are integrated in a single transceiver IC. In other embodiments, the transmit function and the receive function are provided in separate ICs. Laser driver ICs typically have "laser control" ("LC") pins that turns on each laser, and TIAs provide "optical detect" ("OD") signals indicating that light is being received by a photodiode.

In the illustrated embodiment, the control circuit 118A, 118B is electrically coupled to the microcontroller 119A, 119B, as well as to the optical transceiver device 116A, 116B by inputs/outputs 120A, 120B. The inputs/outputs 120A, 120B of the illustrated embodiment include a first laser control pin (labeled as "LC, 0" in FIG. 2), a second laser control pin (labeled as "LC, 1" in FIG. 2), a first optical detect pin (labeled as "OD, 0" in FIG. 2) and a second optical detect pin (labeled as "OD, 1" in FIG. 2). Other embodiments may include more or fewer laser control pins and/or optical detect pins.

The optical transceiver device 116A, 116B has optical outputs 124A, 124B (i.e., optical Tx lanes) and optical inputs 126A, 126B (i.e., optical Rx lanes) for lane 0 and lane 1. Each optical output 124A, 124B and optical input 126A, 126B is optically coupled to an optical fiber 134 within an outer jacket 132 of the optical cable 130. Both high-speed signals and low-speed signals are communicated between ends of the optical cable assembly 100 over the optical fibers 134.

Rather than providing additional transmission medium (e.g., copper wires or optical fibers) for the low-speed signals representing low-speed data (e.g., management data or control data), or receiving and resending low-speed data (which may be costly due to the timing requirements of the particular protocol), embodiments of the present disclosure let the low-speed data travel without digital modification to and from the optical transceiver device 116A, 116B by using the control circuit 118A, 118B to route the low-speed signals representing the low-speed data. As a result, the microcontroller 119A, 119B does not need to meet the same tight timing requirements as the receiving and resending method. The microcontroller 119 only has to route the traffic over the desired lane, and to carry out tasks related to link maintenance, such as blocking low-speed traffic in active mode, or maintaining the link during sleep mode operation. In this manner, embodiments allow the use of a general-purpose, lower-performance microcontroller, and relaxes the timing requirements that the microcontroller has to satisfy.

As described in more detail below, the on-board microcontroller 119A, 119B listens to data packets (low-speed and/or high-speed data packets), interprets them and configures the control circuit 118A, 118B to reflect the state of the communications link provided by the optical cable assembly 100.

In this manner, the control circuit 118A, 118B selectively routes low-speed signals (either low-speed Tx signals on the low-speed Tx line or an on-board Tx signal from the microcontroller 119A, 119B) to one of the laser control pins of the optical transceiver device 116A, 116B in real time. As used herein, "real time" means that the signals are not intercepted and then re-sent by a microcontroller, which causes a delay. The optical transceiver device 116A, 116B converts the low-speed signal received at the laser control pin into an optical signal that is sent over one of the optical fibers 134.

The control circuit 118A, 118B also selectively routes low-speed Rx signals converted from low-speed optical Rx signals by the optical transceiver device 116A, 116B to the microcontroller 119A, 119B or the low-speed Rx line depending on the state of the communication link. Further, the control circuit 118A, 118B may also selectively route a low-speed signal from the microcontroller 119A, 119B (i.e., an on-board Tx signal) to the low-speed Rx line.

Accordingly, embodiments of the present disclosure multiplex low-speed control signals and high-speed payload data over the same optical fibers using the pass through approach. In the examples described herein, control logic is used to route the traffic from the external host or device directly to the laser control and optical detect pins of the optical transceiver device. Example control circuits for routing low-speed control/management signals are described and illustrated in U.S. patent application Ser. No. 14/331,517 filed on Jul. 15, 2014, the disclosure of which is incorporated by reference herein.

The pass-through approach has advantages for maintaining timing of low-speed control data, but may be vulnerable to signal distortion introduced by the optical transceiver device or other electrical components. At high enough data rates, signal distortion may occur. Multiple components within the communication link can contribute to the distortion, such as the laser, the laser driver or the photo-receiver (e.g., a transimpedance amplifier followed by a limiting amplifier).

One type of signal distortion is duty cycle distortion. Duty cycle distortion may be caused by signals or components that have uneven rise and fall times or different high-to-low and low-to-high signal thresholds (see FIGS. 3 and 4). Duty cycle distortion may also occur if the response time between the electrical and optical signals (and vice-versa) is different in the case of a rising edge or a falling edge. As an example, this could occur if the laser turn-on time is different from the laser turn-off time. Similarly, this could also occur if the detection of light defining the optical signal requires a different delay than the detection of the absence of light.

Figure 2B:
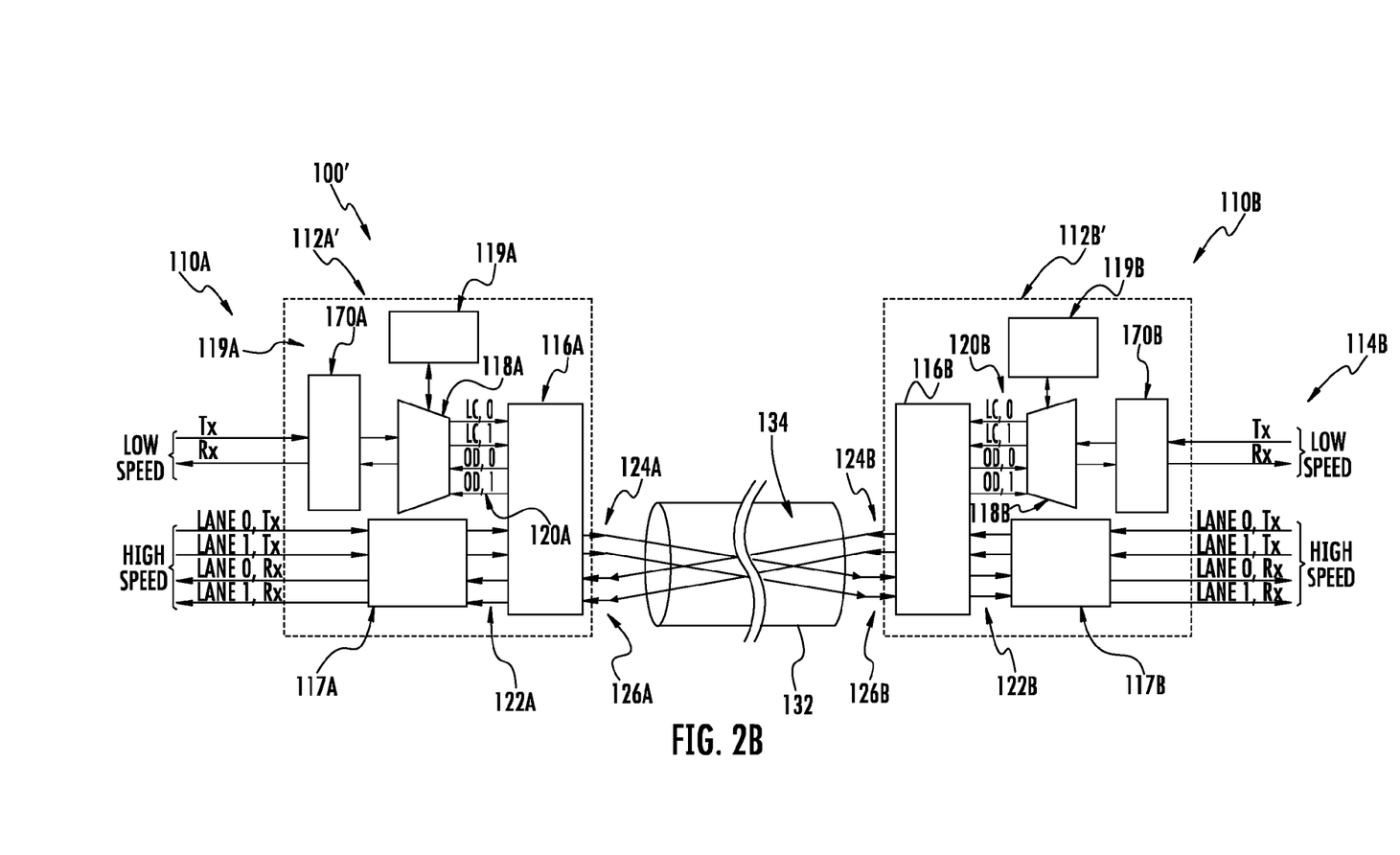
FIG. 2B schematically depicts optical engines within electrical connectors of an optical cable assembly, wherein signal conditioning circuits of the optical engines are disposed between the control circuit and electrical contacts of the electrical connector according to one or more embodiments described and illustrated herein.
Figure 3:
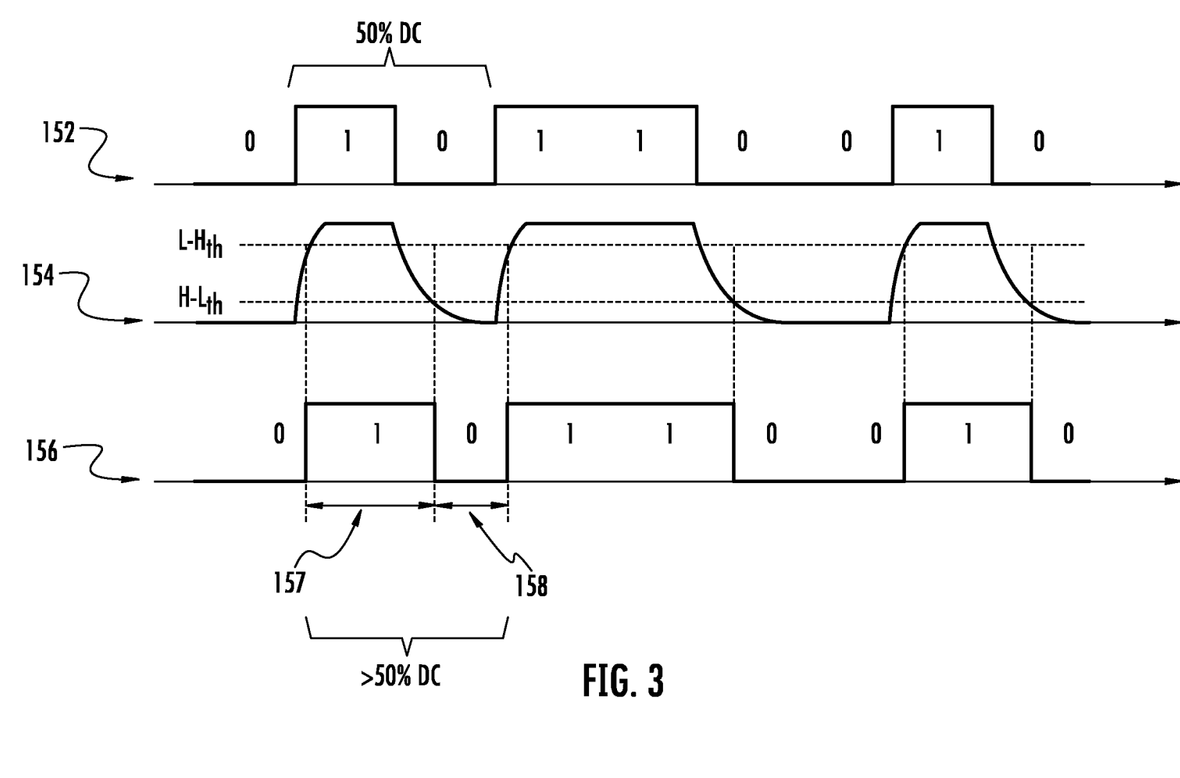
FIG. 3 graphically depicts duty cycle distortion due to slow falling times resulting in a duty cycle of greater than 50%.

FIG. 3 graphically illustrates the case where some element of the optical link, either on the transmit or receive side, has unequal rise and fall times, thereby contributing to duty cycle distortion of the low-speed Rx signal provided to the low-speed Rx line (see FIGS. 2A and 2B). Graph 152 represents a low-speed Tx signal provided to the optical transceiver device 116A, 116B (e.g., at a laser control pin) at one end of the cable. Graph 154 represents an electrical low-speed Rx signal provided at the other end of the cable on an optical detect pin of the optical transceiver device 116A, 116B in response to the original signal of graph 152. A digital electronic component downstream, for example the control circuit 118A, 118B, may have an input stage which has distinct low-to-high L-$H_{th}$ and high-to-low H-$L_{th}$ thresholds. This is typical when the input stage is implemented using a Schmitt trigger circuit. Graph 156 represents the signal digitized by such an input stage.

As shown in graph 154, the optical detect signal provided by the optical transceiver device 116A, 116B has a fall time that is slower than the rise time. The resulting digital output depicted in graph 156 has a logical one bit that is longer than that of a logical zero bit, and therefore has a greater than 50% duty cycle. As a non-limiting example, an optical transceiver device may have a detection delay of 0.4 μs on a rising edge, and as much as 0.8 μs on a falling edge when the light intensity is low. This imbalance of 0.4 μs may become significant when the data rate is high (e.g., approaching 1 Mb/s). For example, at 1 Mb/s the duration of a logical one bit would be 1.4 μs and that of a logical zero bit would be 0.6 μs, instead of 1 μs in both cases, thereby resulting in a duty cycle of 70%.

Figure 4:
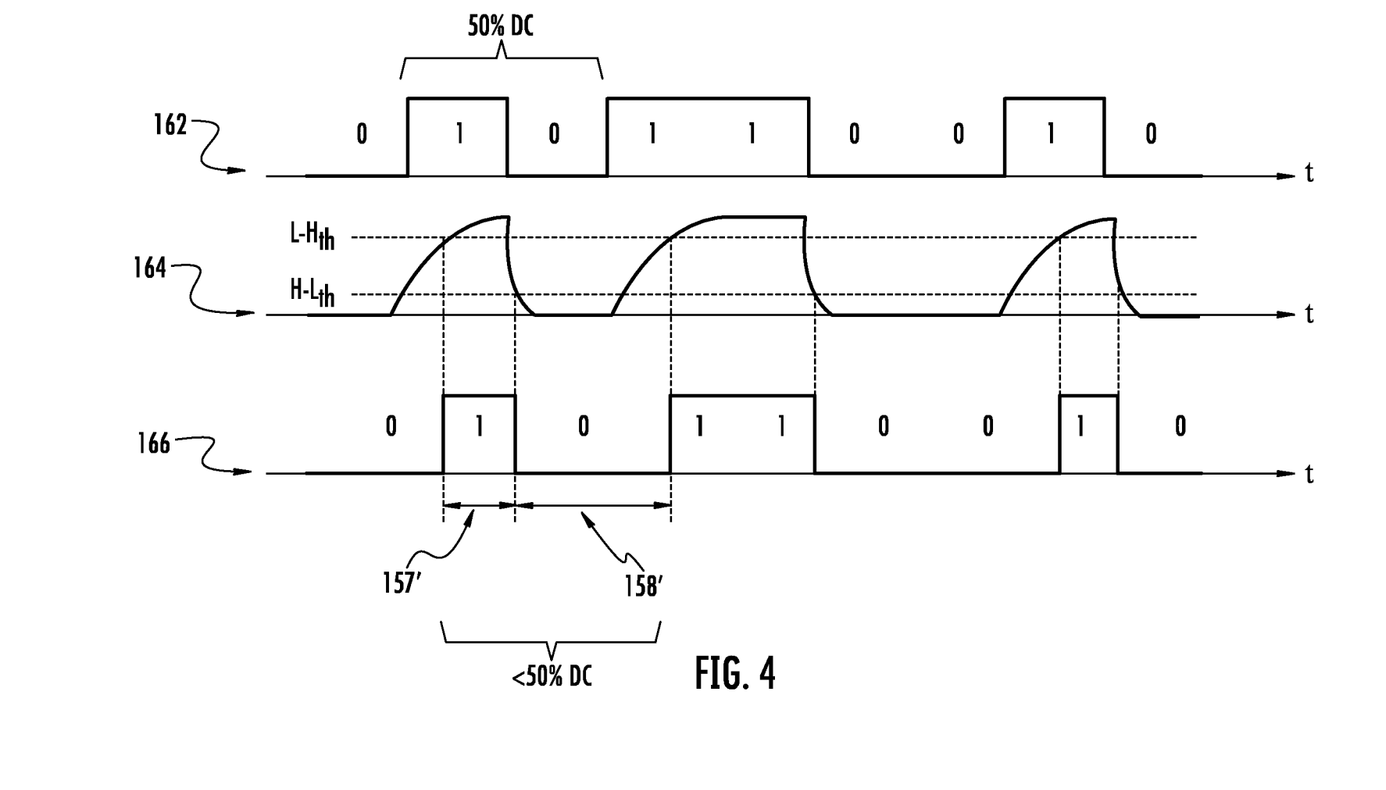
FIG. 4 graphically depicts duty cycle distortion due to slow rising times resulting in a duty cycle of less than 50%.

Referring now to FIG. 4, duty cycle distortion may also occur when the turn-on time on a rising edge is different from the turn-off time on a falling edge. Graph 162 represents an electrical low-speed Tx signal provided to the optical transceiver device 116A, 116B (e.g., at a laser control pin) at one end of the cable. Graph 164 represents the optical detect signal provided at the other end of the cable on an optical detect pin of the optical transceiver device 116A, 116B in response to the original signal of graph 162. Graph 166 is the signal digitized by the input stage of electronic components downstream, for example the control circuit 118A, 118B. As shown in graph 164, the resulting electrical signal has a rise time that is slower than the fall time, thereby causing a duty cycle of less than 50% in the digital signal shown in graph 166.

It should be understood that the duty cycle distortion depicted in FIGS. 3 and 4 are only two examples of duty cycle distortion and, as mentioned above, there are other causes of duty cycle distortion.

Embodiments of the present disclosure provide one or more low-speed signal conditioning circuits 170A, 170B to correct for duty cycle distortion of the low-speed management/control data signals. Regardless of its origin, duty cycle distortion can be corrected by a signal conditioning circuit that delays one edge at the expense of the other. Generally, one or more signal conditioning circuits 170A, 170B (e.g., analog and/or digital electronics) are disposed on the signal path between the optical transceiver device 116A, 116B and the external host or device. Specifically, duty cycle distortion may be compensated by adding a signal conditioning circuit in the path of the low-speed signal, either before it reaches the laser driver, or after it is generated by the receiver, or both. In embodiments, the duty cycle correction only operates on edges or pulses (low-high or high-low transition) and does not involve detection and re-transmission.

Referring once again to FIG. 2A, one or more signal conditioning circuits 170A, 170B are located between the control circuit 118A, 118B and the optical transceiver device 116A, 116B. The one or more signal conditioning circuits 170A, 170B are collectively illustrated as one block in FIG. 2A. It should be understood that any number of signal conditioning circuits 170A, 170B may be provided with respect to any number of laser control and/or optical detect pins of the optical transceiver device 116A, 116B. For example, one or more signal conditioning circuits may be associated with one or more of the optical detect pins (i.e., Rx signal conditioning circuits) but not the laser control pins. Conversely, one or more signal conditioning circuits may be associated with one or more of the laser control pins (i.e., Tx signal conditioning circuits) but not the optical detect pins. Further, signal conditioning circuits may be associated with one or more optical detect pins and one or more laser control pins. It is also noted that the signal conditioning circuits described herein may be incorporated directly into the control circuit 118A, 118B.

FIG. 2B schematically illustrates an optical cable assembly 100' with optical engines 112A', 112B' wherein the one or more signal conditioning circuits 170A, 170B are located between electrical conductors of the electrical connector 110A', 110B' and the control circuit 118A, 118B. In the embodiments of both FIGS. 2A and 2B, the signal conditioning circuits 170A, 170B are located between the optical transceiver device 116A, 116B and the external host or electronic device 102, 104.

Figure 5:
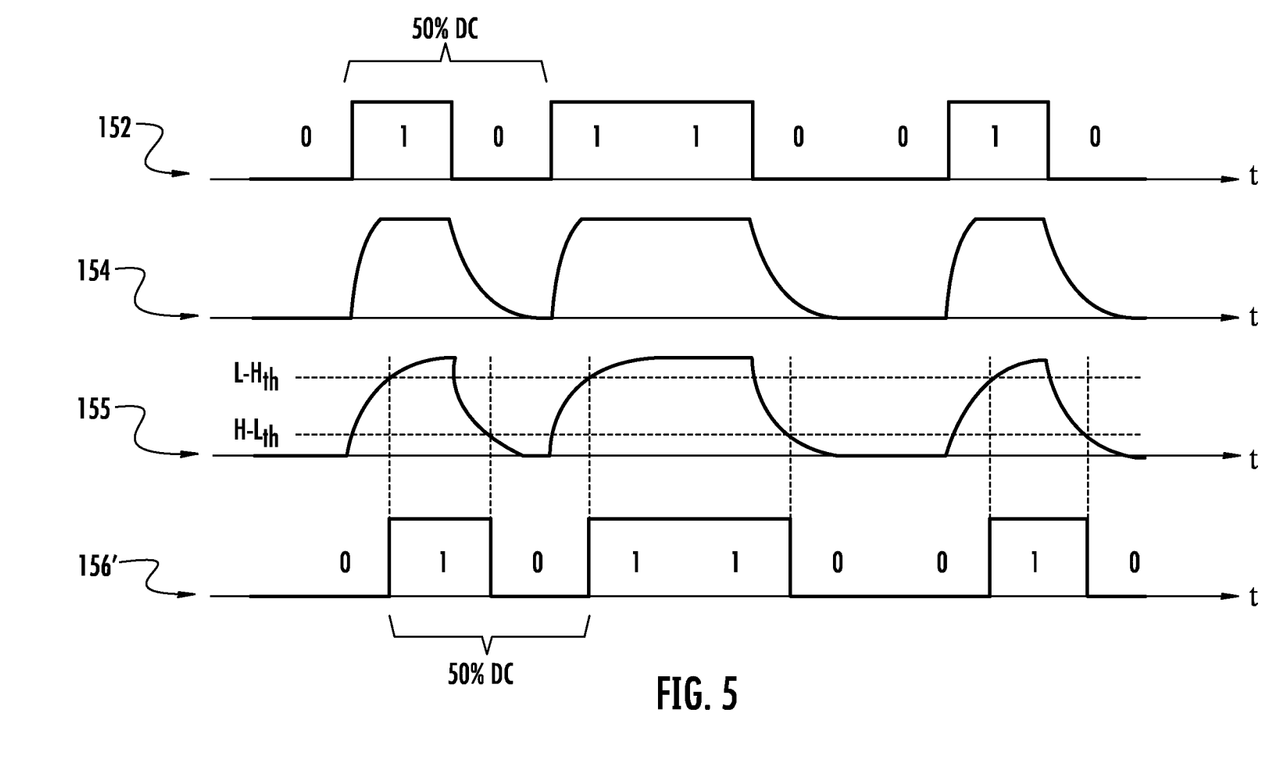
FIG. 5 graphically depicts duty cycle correction of the duty cycle distortion depicted in FIG. 3 by increasing the rise time of the rising edge to provide for a duty cycle of about 50% according to one or more embodiments described and illustrated herein.

FIG. 5 graphically illustrates correction of the duty cycle distortion of FIG. 3 wherein the distortion causes a duty cycle of greater than 50%. When the duty cycle is greater than 50% without correction (i.e., the logical one bit is longer than a duration of the logical zero bit), the rising edges of the low-speed signal should be delayed. Graph 155 illustrates a low-speed signal (i.e., a low-speed Rx signal) that has been corrected by a signal conditioning circuit that increases the rise time of the rising edges of the low-speed signal. Graph 156' represents a digital output (e.g., an output of a downstream Schmitt trigger) of the corrected low-speed signal. Compared to the uncorrected low-speed signal of FIG. 3, the corrected output illustrated by graph 156' has a shortened logical one bit, and therefore a lengthened subsequent logical zero bit, because of the slower rising edges. This results in a corrected duty cycle that is about 50%. Embodiments may also correct the duty cycle by delaying the time at which the rising edge rises from a logical low to a logical high, rather than increasing the time at which the signal transitions from a logical low to a logical high as shown in FIG. 5.

Figure 6:
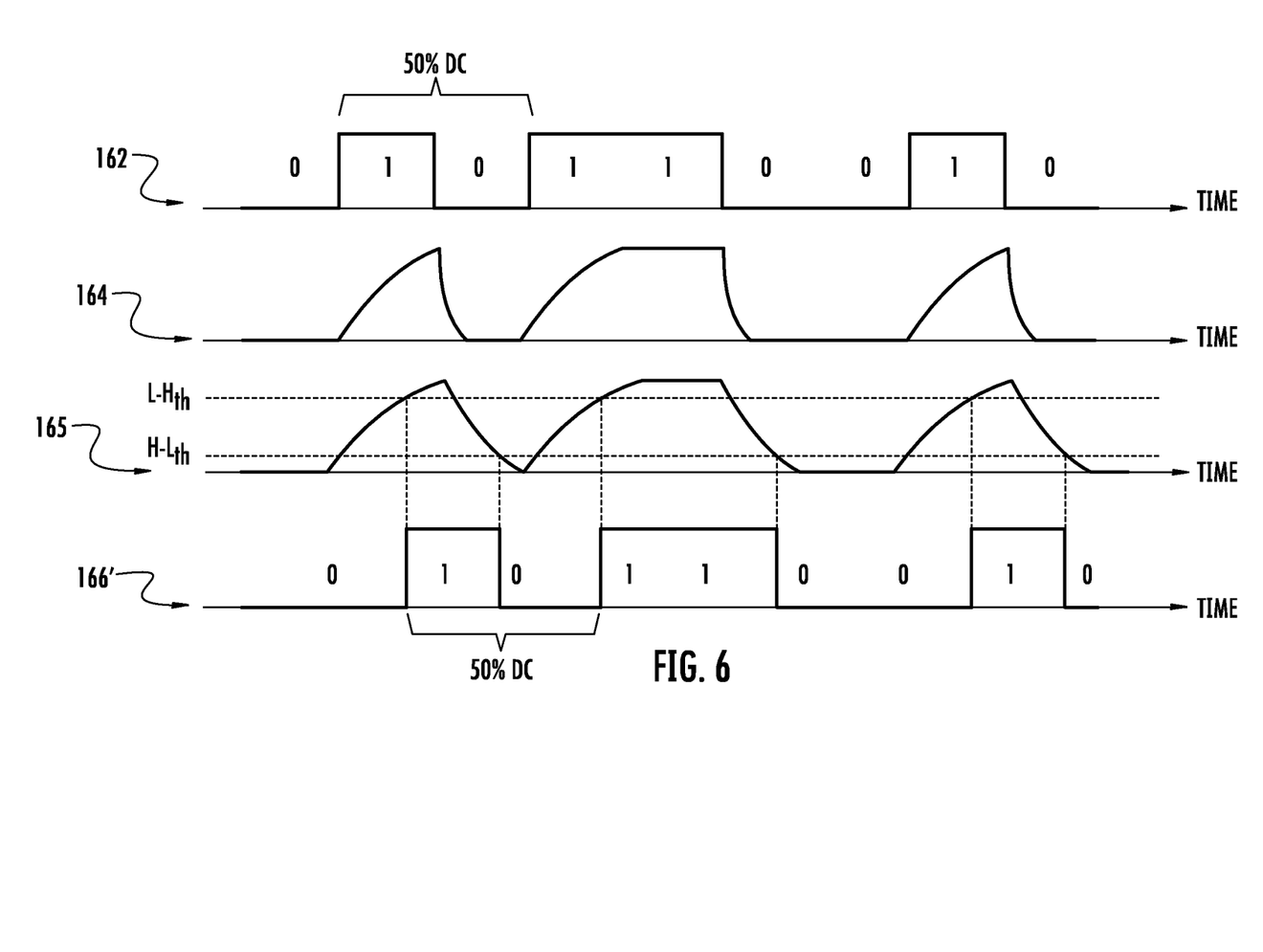
FIG. 6 graphically depicts duty cycle correction of the duty cycle distortion depicted in FIG. 4 by increasing the fall time of the falling edge to provide for a duty cycle of about 50% according to one or more embodiments described and illustrated herein.

FIG. 6 graphically illustrates correction of the duty cycle distortion of FIG. 4 wherein the distortion causes a duty cycle of less than 50%. When the duty cycle is less than 50% without correction (i.e., the logical one bit is shorter than a duration of the logical zero bit), the falling edges of the low-speed signal should be delayed. Graph 165 illustrates a low-speed signal (i.e., a low-speed Rx signal) that has been corrected by a signal conditioning circuit that increases the fall time of the falling edges of the low-speed signal. Graph 166' represents a digital output (e.g., an output of a downstream Schmitt trigger) of the corrected low-speed signal illustrated by graph 165. Compared to the uncorrected low-speed signal of FIG. 4, the corrected output illustrated by graph 166' has a lengthened logical one bit, and therefore a shortened subsequent logical zero bit, because of the increased fall time of the falling edges. This results in a corrected duty cycle that is about 50%. Embodiments may also correct the duty cycle by delaying the time at which the falling edge falls from a logical high to a logical low, rather than increasing the time at which the signal transitions from a logical high to a logical low as shown in FIG. 6.

Figure 7A:
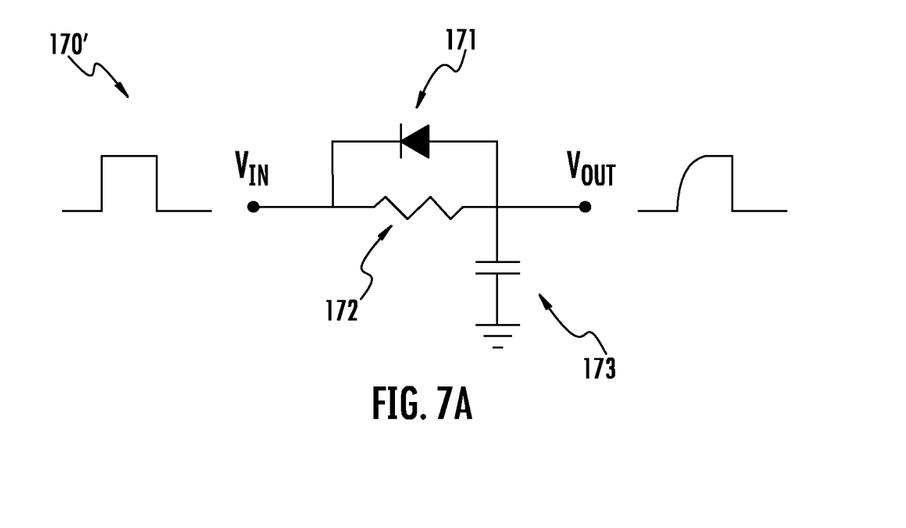
FIG. 7A schematically depicts an example signal conditioning circuit that delays a rising edge of a signal according to one or more embodiments described and illustrated herein.
Figure 7B:
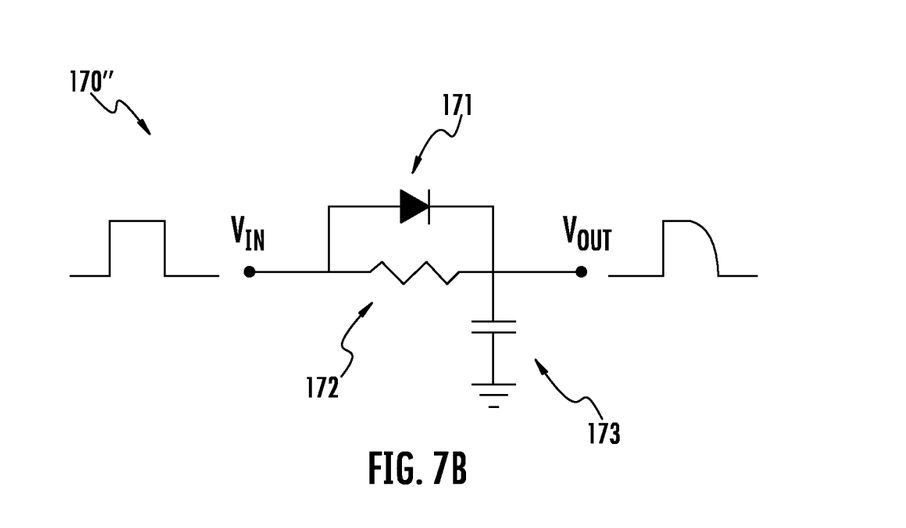
FIG. 7B schematically depicts an example signal conditioning circuit that delays a falling edge of a signal according to one or more embodiments described and illustrated herein.

The one or more signal conditioning circuits 170A, 170B may be any circuit capable of correcting duty cycle distortion. The signal conditioning circuits 170A, 170B may comprise one or more integrated circuits and/or one or more discrete components configured to correct duty cycle distortion. As an example and not a limitation, the signal conditioning circuits described herein may be configured as a retiming controller integrated circuit. However, there are multiple ways of implementing a circuit that slows or delays rising or falling edges. FIGS. 7A and 7B depict non-limiting example signal conditioning circuits 170' and 170" comprising a capacitor 173, a resistor 172, and a diode 171 in parallel with the resistor 172. The role of the diode 171 is to block the current for one type of edge (i.e., rising or falling) in order to force the current to go through the resistor 172 and charge the capacitor 173 slowly, and to allow current to bypass the resistor 172 for the opposite type of edge, thus charging the capacitor 173 quickly. The delay introduced by the signal conditioning circuit is given by the characteristic charge time of the capacitor, $\tau=RC$. For example, a duty cycle imbalance of 0.4 µs could be for the most part compensated using a 470 pF capacitor and a 851Ω resistor.

FIG. 7A schematically illustrates an example signal conditioning circuit 170' (i.e., a Tx or Rx signal conditioning circuit) that increases a rise time of rising edges of logic transitions of a signal, as shown by the illustrated input and output waveforms. In the example signal conditioning circuit 170', the cathode of the diode 171 is electrically coupled to an input of the signal conditioning circuit 170'. FIG. 7B schematically illustrates an example signal conditioning circuit 170" that increases a fall time of falling edges of logic transitions of a signal, as shown by the illustrated input and output waveforms. In the example signal conditioning circuit 170", the cathode of the diode 171 is electrically coupled to an output of the signal conditioning circuit 170".

Figure 8:
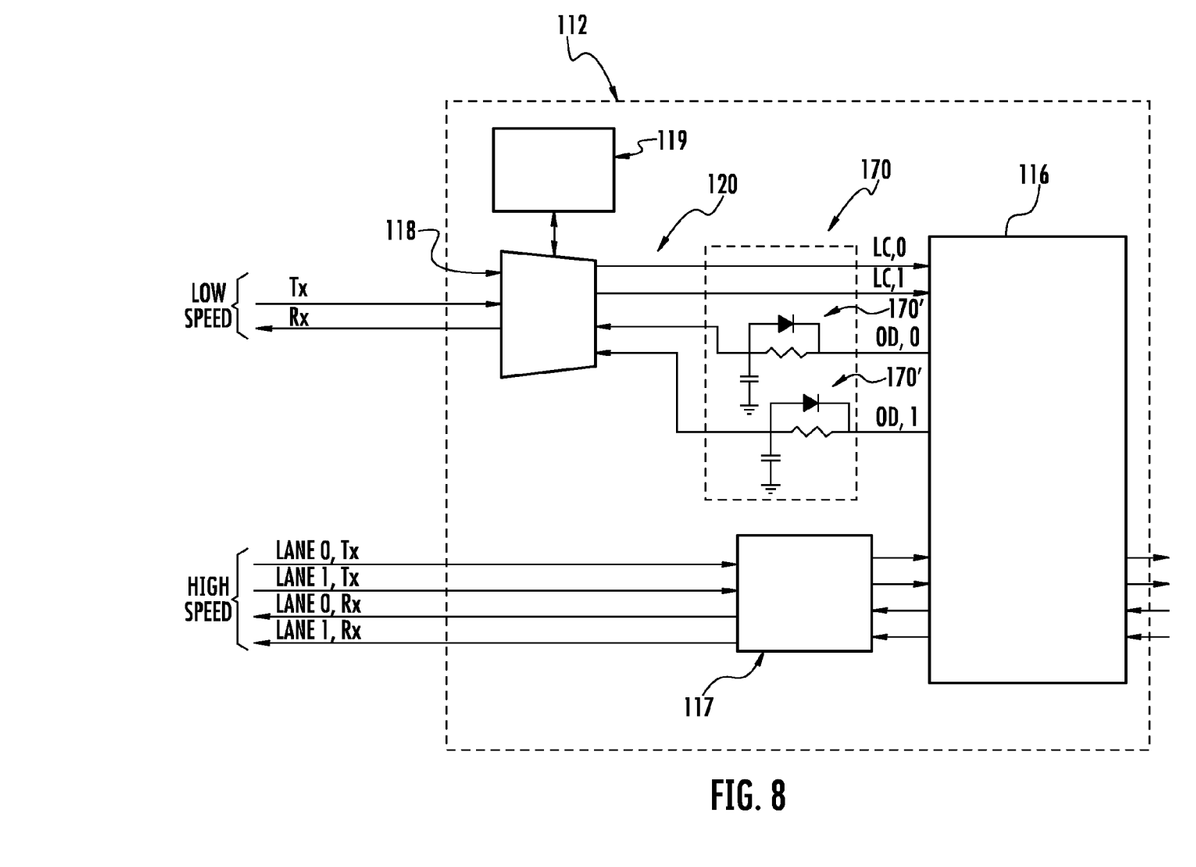
FIG. 8 schematically depicts an example optical engine including the signal conditioning circuit shown in FIG. 7A coupled to the optical detect pins of an optical transceiver device.

FIG. 8 illustrates a case where duty cycle distortion on both optical detect signals is such that the response time for a falling edge is longer than that for a rising edge. Therefore, the signal conditioning circuit 170 comprises a signal conditioning circuit 170' at each optical detect pin such that the rise time of the rising edge of logical transitions is delayed. It should be understood that in other embodiments, a signal conditioning circuits 170" that increases fall times of falling edges and/or increases rise times of rising edges may be positioned at the laser control pins in addition to, or in lieu of, the Rx signal conditioning circuits 170' depicted in FIG. 8.

It should now be understood that embodiments described herein are directed to optical engines and optical cable assemblies capable of transmitting and receiving low-speed signals (e.g., control signals or management signals) over optical fibers in addition to relatively high-speed payload data signals without additional transmission medium, and without receiving and resending the low-speed signals. Embodiments include signal conditioning circuits that correct for duty cycle distortion on low-speed signals regardless of the source of the duty cycle distortion.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. An optical engine comprising:
   a low-speed Tx line;
   a low-speed Rx line, wherein a low-speed Tx signal is transmitted on the low-speed Tx line and a low-speed Rx signal is received on the low-speed Rx line;
   an optical transceiver device comprising:
      an optical Tx lane and an optical Rx lane, wherein the optical transceiver device is configured to convert a high-speed electrical Tx signal into a high-speed Tx optical signal provided on the optical Tx lane, and convert a high-speed Rx optical signal received on the optical Rx lane into a high-speed electrical Rx signal, wherein the low-speed Tx signal and the low-speed Rx signal have a data rate that is lower than a data rate of the high-speed electrical Tx signal and a data rate of the high-speed electrical Rx signal;
      a laser control pin operable to control a laser configured to provide light on the optical Tx lane; and
      an optical detect pin operable to provide an indication as to light detected at the optical Rx lane;
   a control circuit configured to:
      selectively route the low-speed Tx signal at the low-speed Tx line to the optical transceiver device in real time such that the optical transceiver device converts the low-speed Tx signal to a low-speed optical Tx signal at the optical Tx lane; and/or
      selectively route the low-speed Rx signal on the optical detect pin to the low-speed Rx line in real time; and
   a Tx signal conditioning circuit coupled to the laser control pin and/or a Rx signal conditioning circuit coupled to the optical detect pin, wherein:
      the Tx signal conditioning circuit is configured to condition the low-speed Tx signal prior to the optical transceiver device; and
      the Rx signal conditioning circuit is configured to condition the low-speed Rx signal received from the optical transceiver device.

2. The optical engine of claim 1, wherein:
   the Tx signal conditioning circuit is configured to adjust a duty cycle of the low-speed Tx signal prior to the optical transceiver device; and
   the Rx signal conditioning circuit is configured to adjust a duty cycle of the low-speed Rx signal received from the optical transceiver device.

3. The optical engine of claim 1, wherein the Rx signal conditioning circuit and/or the Tx signal conditioning circuit increases a rise time of a rising edge of logic level transitions.

4. The optical engine of claim 1, wherein the Rx signal conditioning circuit and/or the Tx signal conditioning circuit decreases a duration of a logical one bit and increases a duration of a logical zero bit.

5. The optical engine of claim 1, wherein the Rx signal conditioning circuit and/or the Tx signal conditioning circuit increases a fall time of a falling edge of logic level transitions.

6. The optical engine of claim 1, wherein the Rx signal conditioning circuit and/or the Tx signal conditioning circuit increases a duration of a logical one bit and decreases a duration of a logical zero bit.

7. The optical engine of claim 1, wherein:
   the optical engine comprises at least one Rx signal conditioning circuit and at least one Tx signal conditioning circuit;
   the Rx signal conditioning circuit increases a rise time of a rising edge of logic level transitions, or increases a fall time of a falling edge of the logic level transitions; and
   the Tx signal conditioning circuit increases a rise time of a rising edge of logic level transitions, or increases a fall time of a falling edge of the logic level transitions.

8. The optical engine of claim 1, wherein:
   the Rx signal conditioning circuit and/or the Tx signal conditioning circuit comprises a capacitor, a resistor, and a diode;
   a rise time of a rising edge of logic level transitions is increased if a cathode of the diode is electrically coupled to an input of the Rx signal conditioning circuit and/or the Tx signal conditioning circuit; and
   a fall time of a falling edge of the logic level transitions is increased if the cathode of the diode is electrically coupled to an output of the Rx signal conditioning circuit and/or the Tx signal conditioning circuit.

9. The optical engine of claim 1, wherein the Rx signal conditioning circuit and the Tx signal conditioning circuit comprise a timing controller.

10. The optical engine of claim 1, wherein the Rx signal conditioning circuit and/or the Tx signal conditioning circuit is disposed between electrical contacts of an electrical connector and the control circuit.

11. The optical engine of claim 1, wherein the Rx signal conditioning circuit and/or the Tx signal conditioning circuit is disposed between the control circuit and the optical transceiver device.

12. An optical engine comprising:
   a low-speed Tx line;
   a low-speed Rx line, wherein a low-speed Tx signal is transmitted on the low-speed Tx line and a low-speed Rx signal is received on the low-speed Rx line;
   an optical transceiver device comprising a laser control pin operable to control a laser configured to provide light on an optical Tx lane, and an optical detect pin operable to provide an indication as to light detected at an optical Rx lane, wherein:
      the optical transceiver device is configured to convert a high-speed electrical Tx signal into a high-speed Tx optical signal provided on the optical Tx lane, and convert a high-speed Rx optical signal received on the optical Rx lane into a high-speed electrical Rx signal;

the optical transceiver device is configured to convert a low-speed Tx signal on the low-speed Tx line into a low-speed optical Tx signal on the optical Tx lane using the laser control pin;

the optical transceiver device is configured to convert a low-speed optical Rx signal into a low-speed Rx signal on the low-speed Rx line using the optical detect pin; and the low-speed Tx signal and the low-speed Rx signal have a data rate that is lower than a data rate of the high-speed electrical Tx signal and a data rate of the high-speed electrical Rx signal; and a Tx signal conditioning circuit coupled to the laser control pin and/or a Rx signal conditioning circuit coupled to the optical detect pin, wherein:

the Tx signal conditioning circuit is configured to condition the low-speed Tx signal prior to the optical transceiver device; and the Rx signal conditioning circuit is configured to condition the low-speed Rx signal received from the optical transceiver device.

13. The optical engine of claim 12, wherein:
the Tx signal conditioning circuit is configured to adjust a duty cycle of the low-speed Tx signal prior to the optical transceiver device; and
the Rx signal conditioning circuit is configured to adjust a duty cycle of the low-speed Rx signal received from the optical transceiver device.

14. The optical engine of claim 12, wherein:
the optical engine comprises at least one Rx signal conditioning circuit and at least one Tx signal conditioning circuit;
the Rx signal conditioning circuit increases a rise time of a rising edge of logic level transitions, or increases a fall time of a falling edge of the logic level transitions; and
the Tx signal conditioning circuit increases a rise time of a rising edge of logic level transitions, or increases a fall time of a falling edge of the logic level transitions.

15. An optical cable assembly comprising:
an optical cable having a first end and a second end, the optical cable comprising a plurality of optical fibers; and
a first electrical connector assembly disposed at the first end of the optical cable and a second electrical connector assembly disposed at the second end of the optical cable, each of the first electrical connector assembly and the second electrical connector assembly comprising a housing and an optical engine disposed within the housing, the optical engine comprising:
a low-speed Tx line;
a low-speed Rx line, wherein a low-speed Tx signal is transmitted on the low-speed Tx line and a low-speed Rx signal is received on the low-speed Rx line;
an optical transceiver device comprising:
an optical Tx lane and an optical Rx lane, wherein the optical transceiver device is configured to convert a high-speed electrical Tx signal into a high-speed Tx optical signal provided on the optical Tx lane, and convert a high-speed Rx optical signal received on the optical Rx lane into a high-speed electrical Rx signal, wherein the low-speed Tx signal and the low-speed Rx signal have a data rate that is lower than a data rate of the high-speed electrical Tx signal and a data rate of the high-speed electrical Rx signal;

a laser control pin operable to control a laser configured to provide light on the optical Tx lane; and
an optical detect pin operable to provide an indication as to light detected at the optical Rx lane;

a control circuit configured to:
selectively route the low-speed Tx signal at the low-speed Tx line to the optical transceiver device in real time such that the optical transceiver device converts the low-speed Tx signal to a low-speed optical Tx signal at the optical Tx lane; and/or
selectively route the low-speed Rx signal on the optical detect pin to the low-speed Rx line in real time; and a Tx signal conditioning circuit coupled to the laser control pin and/or a Rx signal conditioning circuit coupled to the optical detect pin, wherein:
the Tx signal conditioning circuit is configured to condition the low-speed Tx signal prior to the optical transceiver device; and
the Rx signal conditioning circuit is configured to condition the low-speed Rx signal received from the optical transceiver device.

16. The optical cable assembly of claim 15, wherein:
the Tx signal conditioning circuit is configured to adjust a duty cycle of the low-speed Tx signal prior to the optical transceiver device; and
the Rx signal conditioning circuit is configured to adjust a duty cycle of the low-speed Rx signal received from the optical transceiver device.

17. The optical cable assembly of claim 15, wherein the Rx signal conditioning circuit and/or the Tx signal conditioning circuit increases a rise time of a rising edge of logic level transitions.

18. The optical cable assembly of claim 15, wherein the Rx signal conditioning circuit and/or the Tx signal conditioning circuit decreases a duration of a logical one bit and increases a duration of a logical zero bit.

19. The optical cable assembly of claim 15, wherein the Rx signal conditioning circuit and/or the Tx signal conditioning circuit increases a fall time of a falling edge of logic level transitions.

20. The optical cable assembly of claim 15, wherein the Rx signal conditioning circuit and/or the Tx signal conditioning circuit increases a duration of a logical one bit and decreases a duration of a logical zero bit.

21. The optical cable assembly of claim 15, wherein:
the optical engine comprises at least one Rx signal conditioning circuit and at least one Tx signal conditioning circuit;
the Rx signal conditioning circuit increases a rise time of a rising edge of logic level transitions, or increases a fall time of a falling edge of the logic level transitions; and
the Tx signal conditioning circuit increases a rise time of a rising edge of the logic level transitions, or increases a fall time of a falling edge of the logic level transitions.

22. The optical cable assembly of claim 15, wherein:
the Rx signal conditioning circuit and/or the Tx signal conditioning circuit comprises a capacitor, a resistor, and a diode;
a rise time of a rising edge of logical level transitions is increased if a cathode of the diode is electrically coupled to an input of the Rx signal conditioning circuit and/or the Tx signal conditioning circuit; and
a fall time of a falling edge of the logical level transitions is increased if the cathode of the diode is electrically coupled to an output of the Rx signal conditioning circuit and/or the Tx signal conditioning circuit.

23. The optical cable assembly of claim 15, wherein the Rx signal conditioning circuit and the Tx signal conditioning circuit comprise a timing controller.

24. The optical cable assembly of claim 15, wherein the Rx signal conditioning circuit and/or the Tx signal conditioning circuit is disposed between electrical contacts of the first or second electrical connector and the control circuit.

25. The optical cable assembly of claim 15, wherein the Rx signal conditioning circuit and/or the Tx signal conditioning circuit is disposed between the control circuit and the optical transceiver device.

* * * * *